US012051322B2

United States Patent
Macey et al.

(10) Patent No.: US 12,051,322 B2
(45) Date of Patent: Jul. 30, 2024

(54) SYSTEM WITH WIRELESS INTEGRATED SPA TOPSIDE CONTROL PANEL

(71) Applicant: AQUATIC AV, San Jose, CA (US)

(72) Inventors: Stephen Macey, San Jose, CA (US); Raphael Fils, San Jose, CA (US)

(73) Assignee: AQUATIC AV, San Jose, CA (US)

( * ) Notice: Subject to any disclaimer, the term of this patent is extended or adjusted under 35 U.S.C. 154(b) by 0 days.

(21) Appl. No.: 17/551,008

(22) Filed: Dec. 14, 2021

(65) Prior Publication Data

US 2022/0351608 A1   Nov. 3, 2022

Related U.S. Application Data

(60) Provisional application No. 63/183,331, filed on May 3, 2021.

(51) Int. Cl.
| | |
|---|---|
| G08C 17/02 | (2006.01) |
| H04L 67/12 | (2022.01) |
| H04R 1/02 | (2006.01) |
| H04W 4/80 | (2018.01) |

(52) U.S. Cl.
CPC ............. *G08C 17/02* (2013.01); *H04L 67/12* (2013.01); *H04W 4/80* (2018.02); *H04R 1/025* (2013.01)

(58) Field of Classification Search
CPC ................................ H04W 4/80; Y10S 249/03
See application file for complete search history.

(56) References Cited

U.S. PATENT DOCUMENTS

| 10,925,804 B2 | 2/2021 | Ovalle | |
|---|---|---|---|
| 2008/0129578 A1* | 6/2008 | Petersen | E04H 4/148 |
| | | | 341/176 |
| 2011/0195664 A1* | 8/2011 | Keirstead | H04L 12/282 |
| | | | 455/41.2 |
| 2014/0338115 A1 | 11/2014 | Sadler | |
| 2015/0196456 A1* | 7/2015 | Nicholson | A61H 33/005 |
| | | | 349/12 |
| 2017/0071821 A1* | 3/2017 | Laflamme | H04W 4/80 |
| 2017/0100656 A1* | 4/2017 | Laflamme | H04W 4/80 |
| 2018/0115827 A1* | 4/2018 | Tanaka | H04S 7/00 |
| 2018/0224822 A1* | 8/2018 | Potucek | G05B 19/042 |
| 2019/0155494 A1* | 5/2019 | Laflamme | A61H 33/0087 |
| 2019/0246455 A1* | 8/2019 | Weber | H05B 3/80 |

FOREIGN PATENT DOCUMENTS

WO   2006019273   2/2006

\* cited by examiner

*Primary Examiner* — Wen W Huang

(57) ABSTRACT

Embodiments of the present invention advantageously locate a wireless transceiver within the "topside" control panel of a spa. The wireless transceiver can communicate with a remote controller for control signal communication and to receive data (e.g., music). Since the wireless transceiver of the present invention is located "topside," it avoids the interferences and blockages associated with lower mounted transceivers. Further, since the transceiver is located on the topside controller, there is no need to run a wired communication bus from the Spa pack main controller to a lower mounted transceiver, as done in the prior art systems. Instructions received wirelessly to the topside controller are formatted and sent to the Spa pack main controller. The wireless commands received through the topside controller are passed to the Spa pack main controller and can control all the spa equipment, including, heaters, pumps, lights, speakers, cleaning systems, jets, etc.

21 Claims, 9 Drawing Sheets

SYSTEM WITH WIRELESS INTEGRATED SPA TOPSIDE CONTROL PANEL

CROSS-REFERENCE TO RELATED APPLICATIONS

This application claims the benefit of and priority to provisional patent application Ser. No. 63/183,331, with a filing date of May 3, 2021, which is hereby incorporated by reference in its entirety.

FIELD

Embodiments of the present invention relate to spa equipment and spa functionality. More specifically, embodiments of the present invention relate to spa systems that can be controlled remotely.

BACKGROUND

Today, many spas are equipped with speakers, lighting, cleaning systems, heaters, jets and pumps, etc., which all can be controlled via a control panel typically mounted on or near the spa. All of these spa devices add to the enjoyment of the spa experience.

Many spa systems allow one or more of these spa features/equipment to be controlled remotely, e.g., via a wireless communication channel to a remote control panel, mobile device, or other remote computer. These spa systems, having remote control capability, typically offer the wireless functionality as an add-on to an existing wired spa control panel. In order to implement the wireless functionality add-on, these spa systems place a wireless transmitter/receiver and its antenna "under" the spa and generally co-located with the other spa equipment. Because the spa equipment is typically located under the spa (in an equipment compartment), the wireless transceiver also disposed therein experiences signal interference and degradation due to signal blockage from the water in the spa. Furthermore, the presence of the other equipment in the equipment compartment also causes electrical interference when the equipment is operating. In the case of deck-mounted spas, the deck itself can operate as an obstacle to wireless signal propagation since the transceiver is located under the deck typically.

Another problem with lower mounted transceivers of the conventional art is the requirement that a wired connection (including communication bus) be formed between the Spa Pack main controller and the transceiver, thereby adding to cost and system complexity.

As a result, many wireless enabled spas cannot effectively communicate with remote wireless control devices which leads to a negative customer experience. Some attempts to solve this problem require that the spa be physically positioned and/or oriented in certain ways to help promote wireless communication. But this solution is not well accepted by customers who want flexibility in spa placement and orientation.

What is needed is a better mechanism for providing remote wireless communication and control from remote devices to the spa equipment.

SUMMARY

Embodiments of the present invention advantageously locate a wireless transceiver within the "topside" control panel of a spa. The wireless transceiver can communicate with a remote controller for communication of control signals and to receive data (e.g., music or other audio). Since the wireless transceiver of the present invention is located topside with respect to the spa, it avoids the interferences and blockages associated with lower mounted transceivers. Further, since the transceiver is located on the spa topside controller, there is no need to run a wired communication bus from the Spa Pack main controller to a lower mounted transceiver, as done in the prior art systems.

Instructions received wirelessly at the topside controller are formatted and sent to the Spa pack main controller and executed as if the instructions were input from the user input keys, etc., located on the topside controller. The wireless commands received through the topside controller are passed to the Spa pack main controller and can control all the spa equipment, including, heaters, pumps, lights, speakers, cleaning systems (e.g., chlorine levels), jets, etc.

According to one embodiment, an apparatus includes a spa controller disposed in the equipment compartment of the spa for operation at a user site and configured to control operation of a plurality of spa components and to generate status data regarding the status of one or more of the spa components, and a topside control panel at the user site and configured to communicate with the spa controller to receive status data from the spa controller, to provide instructions to the spa controller, and to communicate data and commands to the spa controller, and where the topside control panel includes a first wireless transceiver for wireless communication with a remote controller device.

According to some embodiments, the remote controller device includes a second wireless transceiver and is operable to receive status data transmitted from the topside control panel over a wireless link between the first and second wireless transceivers.

According to some embodiments, the remote controller device is operable to send command data and receive response data from the topside control panel.

According to some embodiments, the apparatus includes a network gateway interface operable to communicate with an Internet access point.

According to some embodiments, the network gateway interface is configured to route command and response data between the topside control panel and a web services provider.

According to some embodiments, the transceiver is further operable to receive audio and control data for audio playback and control.

According to a different embodiment, a spa system is disclosed. The spa system includes a basin for holding water, spa equipment including pumps and jets, and a topside mounted control panel disposed on a top portion of the basin and operable for controlling the spa equipment, the topside mounted control panel including: a processor, memory, and an integrated wireless transceiver operable to wirelessly communicate with a remote controller device for remote control of the spa equipment.

According to some embodiments, the integrated wireless transceiver is coupled to communicate with the processor and where further, the integrated wireless transceiver is operable to wirelessly receive remote commands and supply the remote commands to the processor for control of the spa equipment.

According to some embodiments, the spa equipment further includes a plurality of speakers, and where the integrated wireless transceiver is operable to receive audio information for playback using the plurality of speakers.

According to some embodiments, the spa equipment further includes RGB lighting sources, and where the integrated wireless transceiver is operable to receive lighting control information for adjusting light output of the RGB lighting sources.

According to some embodiments, the spa equipment further includes a heat pump, and where the integrated wireless transceiver is operable to receive heat pump control information for operating the heat pump.

According to some embodiments, the spa equipment further includes a chlorine supply water treatment system e.g., ozone generator, chlorine generator, and where the integrated wireless transceiver is operable to receive chlorine supply information for operating a water sanitizer supply.

According to some embodiments, the integrated wireless transceiver communicates using Bluetooth wireless.

According to some embodiments, the integrated wireless transceiver communicates using BLE wireless.

According to some embodiments, the integrated wireless transceiver communicates using WIFI wireless communication.

According to some embodiments, the integrated wireless transceiver communicates using Thread wireless communication According to some embodiments, the integrated wireless transceiver communicates using Zigbee wireless communication According to some embodiments, the integrated wireless transceiver communicates using custom RF wireless communication According to some embodiments, the integrated wireless transceiver is operable to wirelessly provide spa status information to the remote controller device for display thereof.

According to some embodiments, the integrated wireless transceiver is operable to receive software updates via the remote controller device for updating at least one of: the spa equipment, the spa topside mounted control panel, and wired or wirelessly connected peripheral devices, e.g. audio amplifiers, water treatment system, lighting controllers.

According to another embodiment, a spa system is disclosed. The spa system includes a basin for holding water, spa equipment including a heater and a pump, and a topside mounted control panel disposed on a top portion of the basin and operable for controlling the spa equipment, the topside mounted control panel including: a processor, memory, and an integrated wireless transceiver operable for wirelessly communicating with a web-based service provider.

According to some embodiments, the spa system includes a network gateway interface that bridges communication between the integrated wireless transceiver and the web-based service provider.

According to some embodiments, the web-based service provider is configured to receive operation data from the integrated wireless transceiver, analyze the operation data, and provide spa equipment configuration data to the topside mounted control panel based on analyzed operation data.

According to some embodiments, said wireless transceiver also receives audio signals and forms an audio network with a plurality of compatible wireless speakers systems to form an audio network for the purpose of distributing audio both within the spa and outside the spa, where said wireless transceiver configured as the Master device in the audio network.

According to some embodiments, said wireless transceiver also receives audio signals and forms an audio network with an audio amplifier configured as Master with a compatible wireless transceiver to form an audio network for the purpose of distributing audio both within the spa and outside the spa, where said wireless transceiver configured as the Slave device in the audio network.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
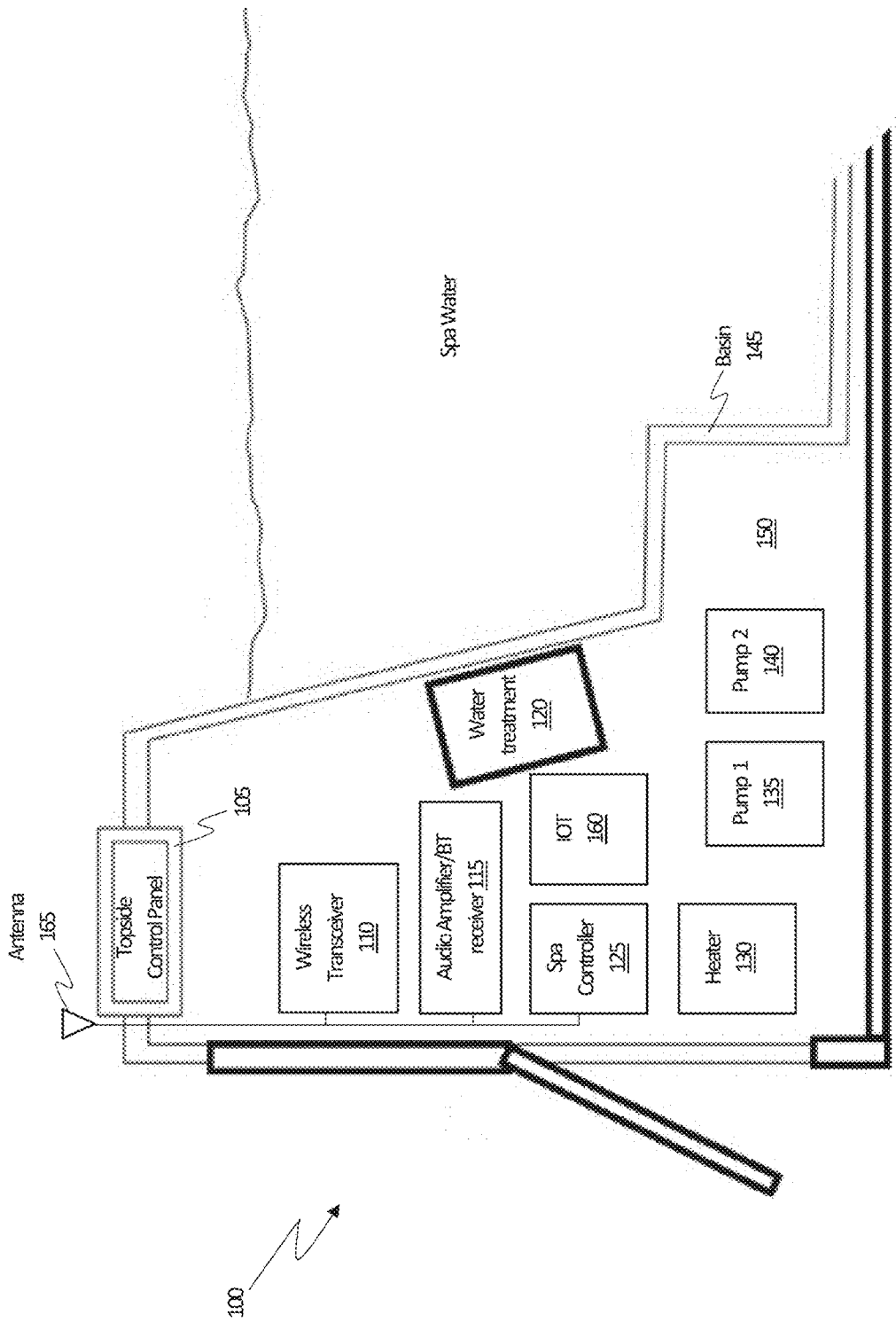
FIG. 1 is a block diagram depicting an exemplary spa system including a topside control panel for controlling spa equipment disposed within an equipment compartment.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method. Although steps and sequencing thereof are disclosed in a figure herein describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "associating," "identifying," "controlling," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

System with Wireless Integrated Spa Topside Control Panel

Embodiments of the present invention advantageously locate a wireless transceiver within the "topside" control panel of a spa system for effective remote control thereof. The wireless transceiver can communicate with a remote controller for control signal communication and can receive data (e.g., music or other audio) therefrom. Since the wireless transceiver of the present invention is located "topside," it avoids the interferences and blockages associated with lower mounted transceivers of the prior art. Further, since the transceiver is located on the topside controller, there is no need to run a wired communication bus from the Spa Pack Main Controller to a lower mounted transceiver, as done in the prior art systems. Instructions received wirelessly to the topside controller are formatted and sent to the Spa pack main controller and advantageously executed as if the instructions were input from the user input keys, etc., located on the topside controller. The wireless commands received through the topside controller are passed to the Spa pack main controller and can control all the spa equipment, including, heaters, pumps, water treatment (e.g., chlorine supply), lights, speakers, cleaning systems, jets, etc.

FIG. 1 depicts an exemplary spa system 100 including a topside control panel 105 for controlling spa equipment disposed within equipment compartment 150. As depicted in FIG. 1, all equipment except the spa topside control panel 105 are located in the equipment compartment 150, including high power electrical equipment such as heater 130, pumps 135 and 140, and water treatment device 120. Moreover, wireless transceiver 110 is located below the water line of the spa which blocks propagation of wireless signals. The wireless transceiver may be located even further lowered below grade in a deck installation, which further blocks wireless signals.

In the example of FIG. 1, the electrical noise (e.g., electromagnetic interference (EMI)/radio-frequency interference (RFI)) from adjacent electrical and electronic devices in spa equipment compartment 150 disposed below or near water level and other physical obstructions limits radio range and signal integrity. Audio amplifier 115 includes an integrated Bluetooth radio which can experience the same adverse radio environment within equipment compartment 150, and further adds a competing radio signal to the spa environment. Moreover, wireless transceiver 110 requires a separate pairing process to link the user's personal device (e.g., the remote controller device) to the transceiver for music operations. The user must also perform a separate and cumbersome step to link their personal device to the data transceiver of the audio amplifier 115. Antenna 165 is disposed topside and can be optionally coupled to wireless transceiver 110, audio amplifier/BT receiver 115, and/or spa controller 125 to increase transmission and reception thereof. According to some embodiments, wireless transceiver 110 is integrated into spa controller 125 and coupled to external antenna 165.

The spa system 100 may include an internet-of-things (IOT) radio 160 for wireless communication with IOT peripheral devices. In these implementations, the spa controller 125 must arbitrate IOT command/response data with other accessory devices, and the topside control panel 105 issues commands and responses independent of any IOT accessories, which can cause issues when the same commands are issued from multiple sources. For example, a Bluetooth device could be communicating with the spa controller 125 when an IOT command is received over IOT radio 160. Moreover, the Bluetooth Audio Receiver of Audio Amplifier 115 generates competing radio signals in proximity to IOT Radio 160, which can cause interference, reduced bandwidth, and reduced range of communication.

Figure 2:
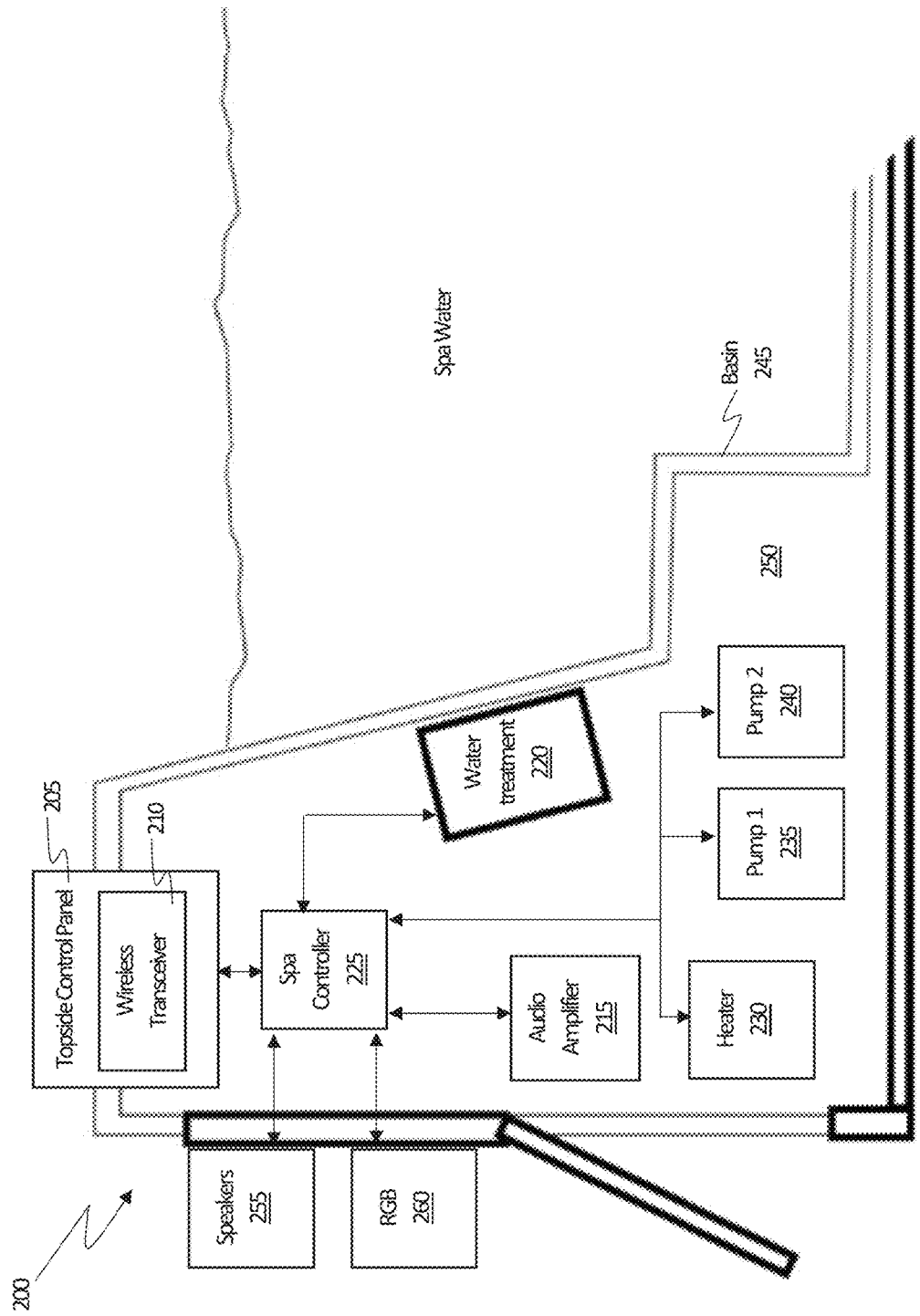
FIG. 2 is a block diagram depicting an exemplary spa system including a topside control panel having an integrated wireless transceiver for controlling spa equipment disposed within equipment compartment remotely according to embodiments of the present invention.

FIG. 2 depicts an exemplary spa 200 including a topside controller for controlling spa equipment in accordance with embodiments of the present invention. As depicted in FIG. 2, all equipment except the spa topside control panel 205 are located in the equipment compartment 250 including high power electrical equipment, such as heater 230, pumps 235 and 240, and water treatment device 220. Advantageously, wireless transceiver 210 is located above the water line and is not installed in an adverse radio environment (e.g., within an equipment compartment that houses other sources of competing radio signals). Accordingly, wireless transceiver can advantageously reliably and effectively communicate with remote wireless devices over relatively long distances as it experiences less radio obstructions by virtue of its topside position.

Wireless transceiver 210 of topside control panel 205 can receive audio data and control information from remote wireless devices. The audio data can be passed to audio amplifier/receiver 215 for audio playback using speakers 255, and control information can be used to configure and operate spa equipment, such as heaters, pumps, lighting, etc. The color and intensity of RGB lighting 260 can be controlled by the spa controller 225 according to input/commands from the topside control panel 205. Moreover, wireless transceiver 210 can communicate with remote computer systems for uploading spa-related data. The data can be analyzed remotely and new operating parameters are provided to spa controller 225 via wireless transceiver 210. Furthermore, wireless transceiver 210 can receive software updates over the air form remote devices.

Figure 3:
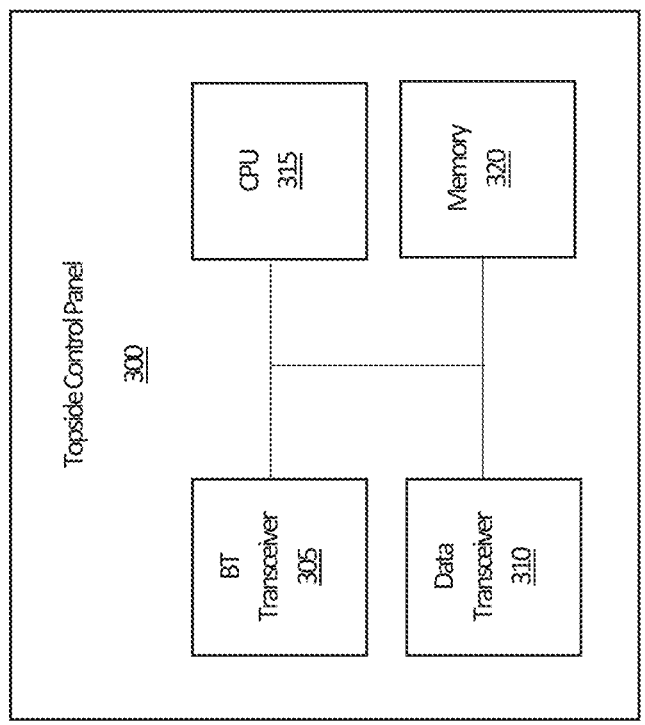
FIG. 3 is a block diagram depicting an exemplary topside control panel including an integrated wireless transceiver for wireless communication according to embodiments of the present invention.

FIG. 3 depicts an exemplary topside control panel 300 having an integrated transceiver that can be controlled wirelessly according to embodiments of the present invention. By removing the wireless transceivers from the equipment compartment containing heat and interference generating equipment, the wireless transceivers can communicate more efficiently with other wireless devices. For example, the effective throughput, reliability, and range of the wireless transceivers are substantially improved according to some embodiments.

Topside control panel 300 includes transceivers 305 and 310 for communicating with other devices wirelessly. In the example of FIG. 3, topside control panel 300 includes a Bluetooth transceiver 305 for performing music operations and a data transceiver 310 for receiving control data, response data, and other information. According to some embodiments, topside control panel 300 can include an IOT transceiver (not pictured) for communicating with IOT peripherals. Received data can be stored in memory 320 and accessed by CPU 315. Furthermore, memory 320 can store instructions for execution by CPU 315 to perform heater control operations, pump control operations, spa maintenance operations, diagnostics operations, software updates, etc.

Figure 4:
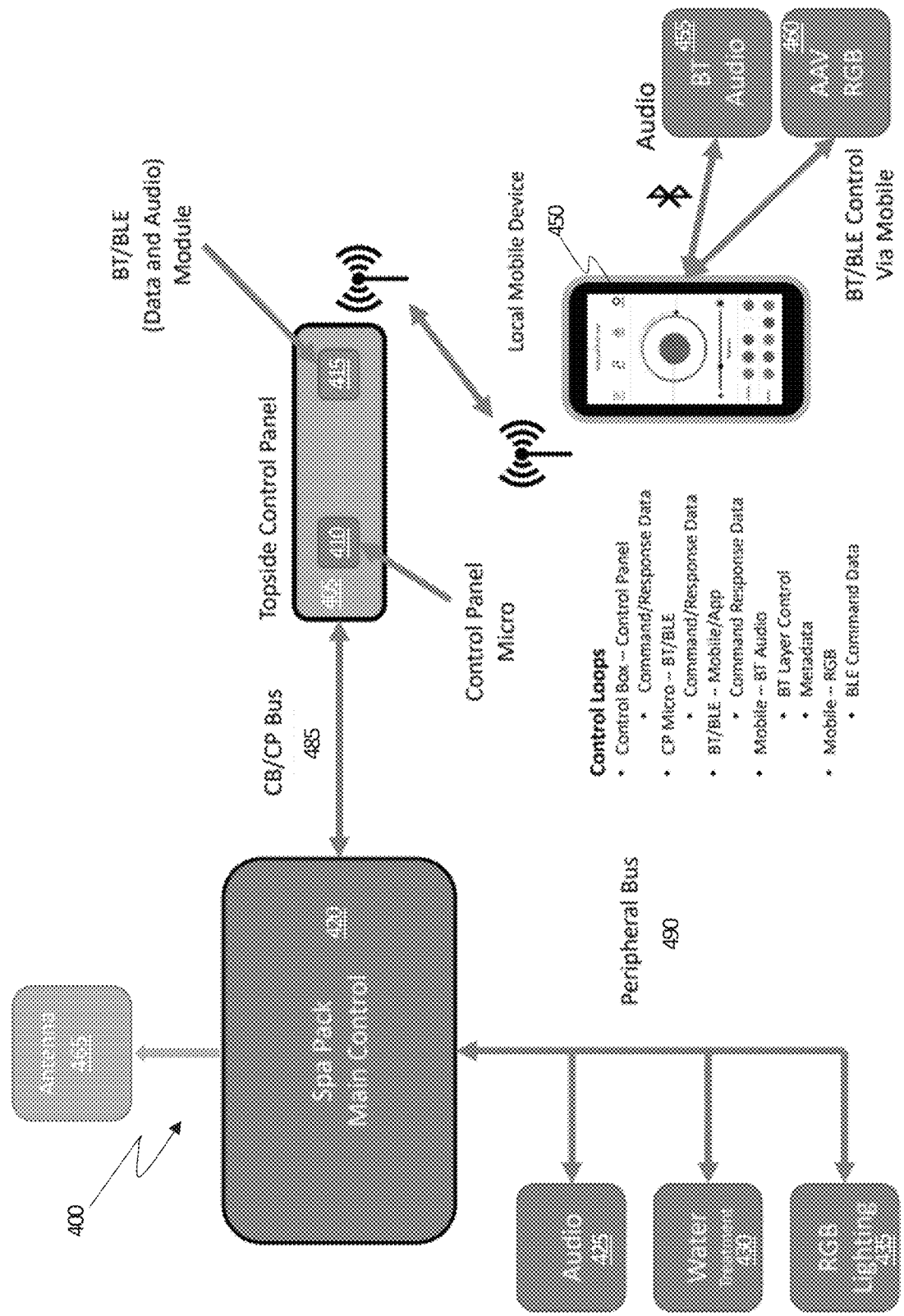
FIG. 4 is a block diagram of an exemplary spa control system for controlling a spa system, including a topside control panel having a microprocessor and a wireless radio according to embodiments of the present invention.

FIG. 4 depicts an exemplary spa control system for controlling a spa, including a topside control panel 405 having a microprocessor 410 and a wireless radio 415 according to embodiments of the present invention. Wireless radio 415 can be an internet-of-things (IOT) radio 415 and/or a Bluetooth (BT)/Bluetooth low energy (BLE) radio according to embodiments of the present invention. Topside control panel 405 can be disposed above the water line of the spa and outside of the spa skirt to improve transmission and reception capabilities. Topside control panel 405 is electronically coupled to spa pack main controller 420 over a control box (CB)/control panel (CP) communication bus 485. CB/CP communication bus 485 can be an RS-485, an RS-422, or other suitable communication bus recognized by those skilled in the art. Spa pack main controller 420 is electronically coupled with audio module 425, water treatment module 430, and RGB lighting module 435 over peripheral communication bus 490. Peripheral communication bus 490 can be an RS-485, an RS-422, or other suitable communication bus recognized by those skilled in the art. Spa pack main controller 420 receives command and response data from topside control panel 405, and arbitrates the use of peripheral communication bus 490. Audio signals are passed from topside control panel 405 to audio module 425 over a wired audio connection 495.

Topside control panel 405 communicates wirelessly with wireless device 450 (e.g., a smartphone or other mobile electronic device) using a data+Bluetooth connection for sending control information, music playback information, etc. IOT data can be collected by microprocessor 410 and converted to spa pack command/response data. The Bluetooth audio can be decoded and conditioned by a single radio 415 to reduce radio competition proximate to the spa.

According to some embodiments, wireless device 450 executes a BT/BLE module 455 and an RGB control application 460 for example. BT/BLE module 455 issues command/response data to topside control panel 405 that can be passed to audio module 425 for playback, and issues BLE command data to topside control panel 405 that can be passed to RGB lighting module 435 for performing lighting control to adjust the lighting output of RGB lighting module 435 (e.g., intensity, color, etc.). The RGB lighting module 435 can include a plurality of LEDs and an LED controller, for example. Optional antenna 465 is disposed above the water line outside of the equipment compartment and can be directly connected to spa pack main controller 420 to increase reception and transmission thereof.

Figure 5:
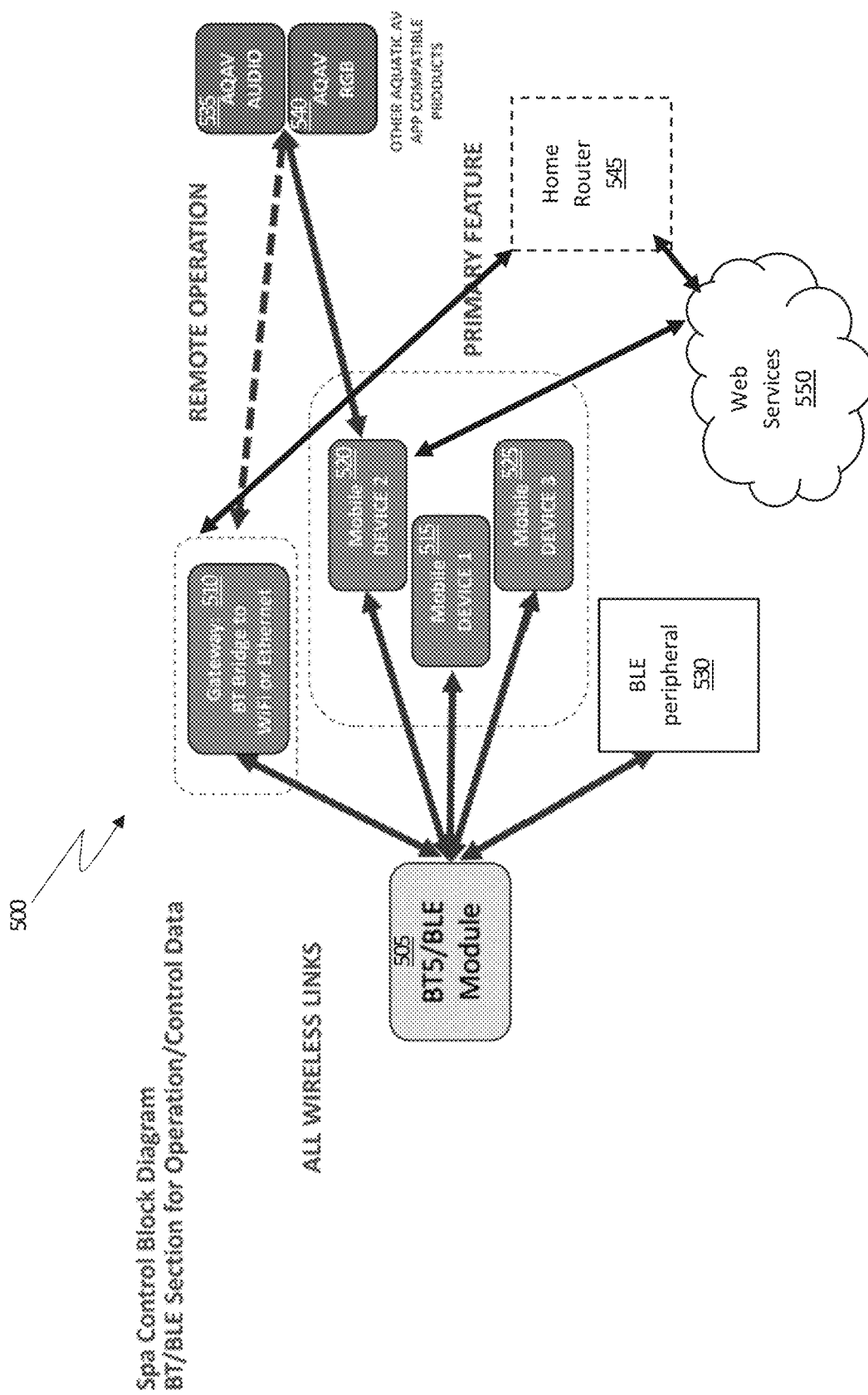
FIG. 5 is a block diagram and data flow diagram of an exemplary spa control system operable to communicate with remote devices according to embodiments of the present invention.

FIG. 5 is a block diagram and data flow diagram of an exemplary spa control system 500 for providing BT/BLE operation and control data according to embodiments of the present invention. Mobile electronic devices can connect wirelessly to spa control system 500 over BT/BLE for performing spa functions and adjusting spa settings. In the example of FIG. 5, BT5/BLE module 505 can include an integrated antenna and is in wireless communication with gateway 510, mobile device 1 (515), mobile device 2 (520), mobile device 3 (525), and BLE peripheral device 530. In one embodiment, gateway 510 is a network interface capable of bridging wireless BT operation/control data over Wi-Fi or ethernet. Gateway 510 can be configured to communicate with a home router, network switch, or wireless access point, for example.

Each connected wireless device can send and receive operation and control data for performing various functions. For example, a wireless electronic device (e.g., mobile device 2 (520)) can send remote operation/control data over BT/BLE to BT5/BLE module 505 directly, or a wireless electronic device in communication with gateway 510 can send operation/control data via gateway 510. For example, a wireless electronic device can send operation/control data to gateway 510 over ethernet or Wi-Fi, and the gateway 510 acts like a wireless bridge for communicating the information to BT5/BLE module 505 wirelessly. The operation/control data can include audio data 535 and lighting control data 540 provided by a software application executed by connected mobile device, for example. In the example of FIG. 5, audio data 535 and lighting control data 540 are transmitted from mobile device 2 (520) to gateway 510. Gateway 510 provides the received data to BT5/BLE module 505 for performing audio and lighting operations.

BLE peripheral device 530 in wireless communication with BT5/BLE module 505 can provide various types of operation and control information, such as RGB lighting control, audio data and control information, water treatment control, proximity sensor data, cover sensor data, remote water draining/filling information, and heat pump control. The information and control data can be transmitted wirelessly directly to BT5/BLE module over BT/BLE from gateway 510 or a connected wireless device.

According to some embodiments, BT5/BLE module 505 receives control information that adjusts a chlorine level of the spa.

According to some embodiments, BT5/BLE module 505 receives software updates from an external device.

A user can use their mobile device to control the spa system. According to some embodiments, a mobile electronic device in communication with BT5/BLE module 505 (e.g., mobile device 2 (520)) sends and receives data over the internet with a web-based service 550 (e.g., a cloud service platform) that performs data collection and analytics regarding spa control. The mobile electronic device can receive updated control and configuration information based on the analytics performed by the web-based service 550. For example, the analytics can be related to heat pump control and spa maintenance to improve the longevity of spa components and detect issues with spa components early so the issues can be addressed.

An application executed by the mobile electronic device can periodically upload/download spa data to/from the web-based service 550. An application executed by the mobile electronic device can periodically check for software updates and provide new updates to the spa control system via BT5/BLE module 505. Time and service information for pumps and heaters and temperature data can be transmitted to the spa control system via BT5/BLE module 505.

According to other embodiments, BT5/BLE module 505 communicates wirelessly with web-based service 550 over optional gateway 510. Gateway 510 can be in communication with home router 545 over Wi-Fi or ethernet, for example, to send and receive data with web-based service 550. Communicating over gateway 510 provides a persistent link between the spa control system and web-based service 550 so that data can be uploaded/downloaded to/from the cloud at any time without requiring a wireless electronic device to be connected to BT5/BLE module 505.

According to some embodiments, BT5/BLE module 505 is in communication with both gateway 510 and a mobile electronic device (e.g., mobile electronic device 1 (510)). In this case, gateway 510 can provides a persistent link to web-based services 550, and the mobile electronic device can provide user control functionality. According to some embodiments, gateway 510 includes a dock that can receive a smart speaker or similar device for audio playback and further control of the spa control system 500.

Figure 6:
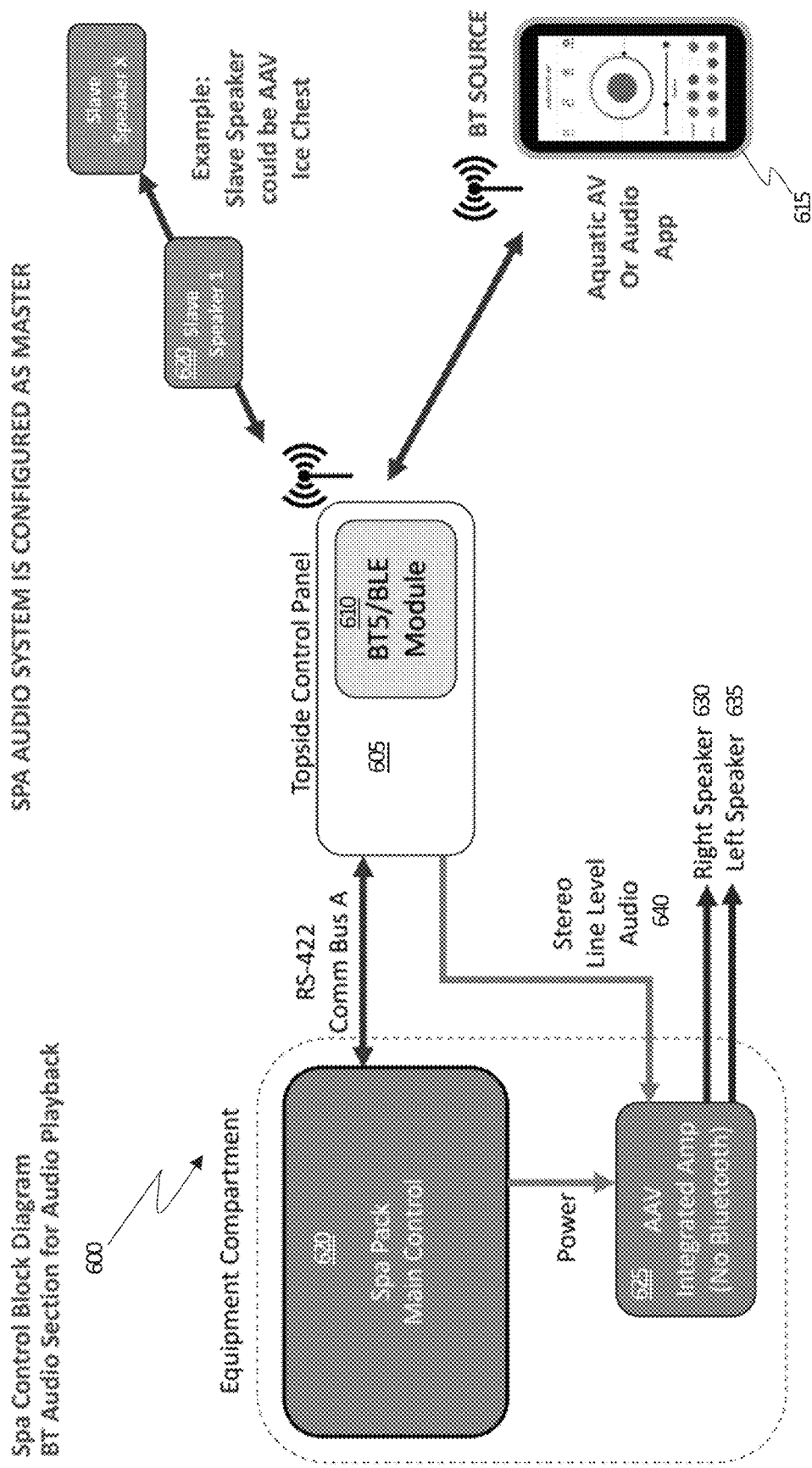
FIG. 6 depicts a block diagram and data flow diagram of an exemplary spa control system configured in a master mode according to embodiments of the present invention.

FIG. 6 depicts a block diagram and data flow diagram of an exemplary spa control system 600 according to embodiments of the present invention. Topside control panel 605 including BT5/BLE module 610 is disposed above the spa waterline and outside of equipment compartment 615 for more efficient and reliable wireless transmission with remote devices. In the example of FIG. 6, the spa audio system controlled by topside control panel 605 is configured as a "master" device for performing audio control operations. BT5/BLE module 610 communicates wirelessly with one or more slave speakers 615 for audio playback, and sends playback information to AAV integrated amp 625 over a wired line level audio connection 640. BT5/BLE 610 can also communicate wirelessly with wireless device 615 for receiving audio information and control. BT5/BLE module 610 communicates directly with spa pack main control 620 over a communication bus (e.g., an RS-422 communication bus) to provide control information received from wireless device 615, for example. AAC integrated amp 625 is powered by spa pack main control 620 and drives left speaker 630 and right speaker 635 for audio playback.

Figure 7:
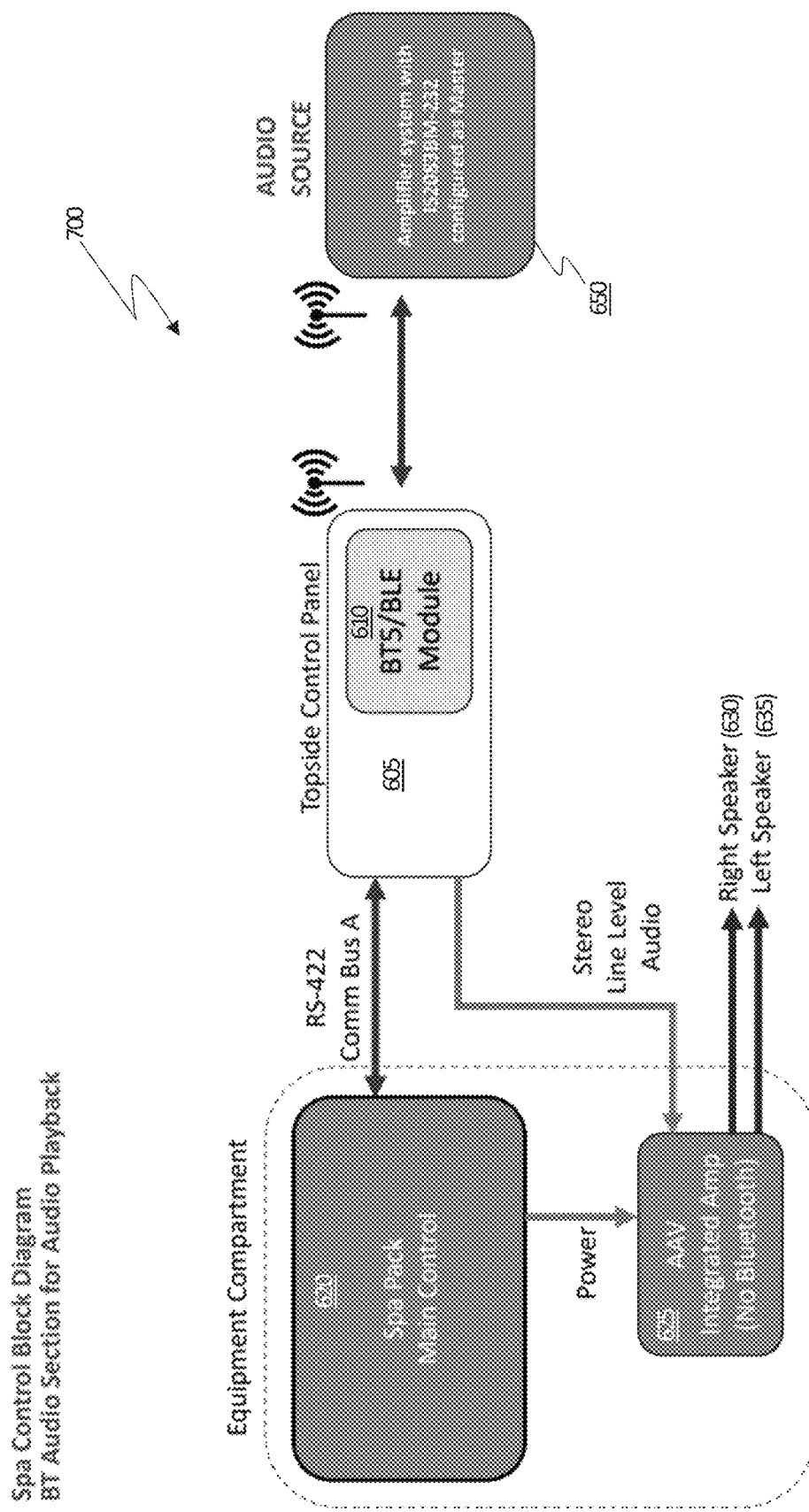
FIG. 7 depicts a block diagram and data flow diagram of an exemplary spa control system configured in a slave mode according to embodiments of the present invention.

In the example of FIG. 7, the spa audio system 700 controlled by topside control panel 605 is configured as a "slave" device for performing audio control operations. Topside control panel 605 includes BT5/BLE module 610 disposed above the spa waterline for wireless communication. In this embodiment, external audio source 650 is configured as the "master" device for sending control information to the topside control panel 605 for audio playback. For example, external audio source 650 can be an amplifier system with BT5/BLE configured as a master.

Some embodiments of the present invention can be retrofitted to existing spas by replacing the spa control pack and the topside controller.

Exemplary Wireless Gateway and Portable Speaker Docking Device

Figure 8:
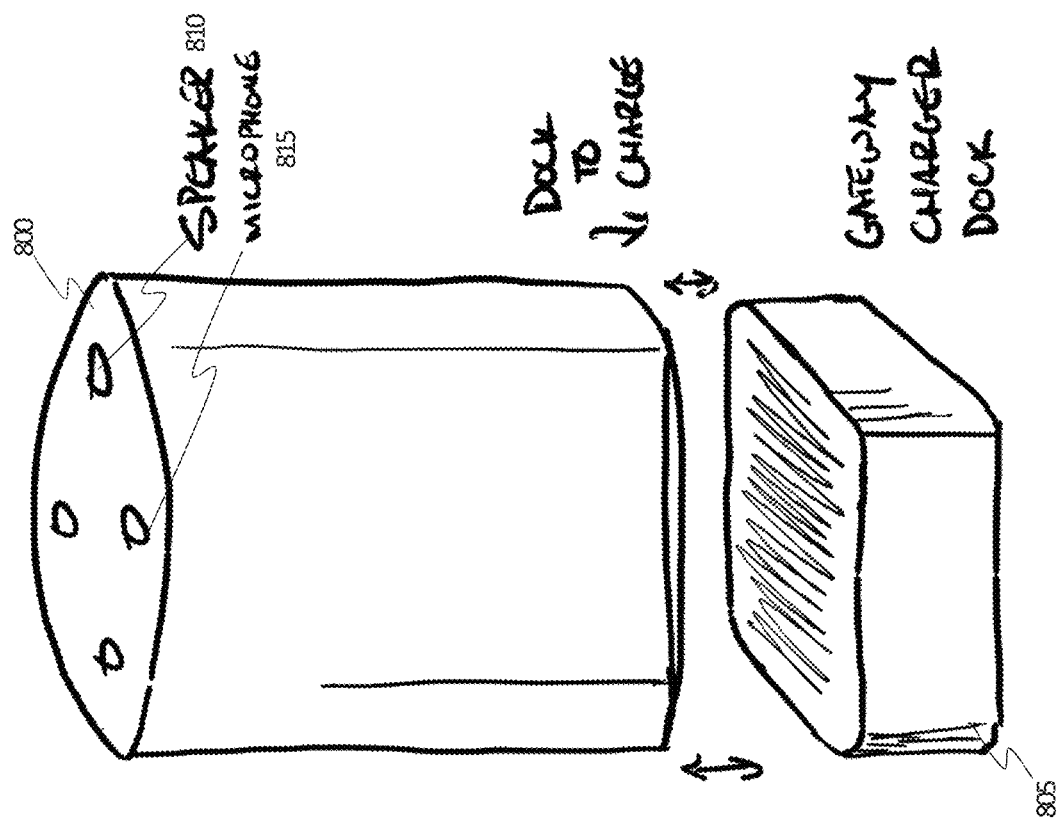
FIG. 8 depicts an exemplary wireless gateway and speaker dock with an exemplary smart speaker device according to embodiments of the present invention.

FIG. 8 depicts an exemplary gateway 800 and a portable, battery-powered smart speaker 805 according to embodiments of the present invention. Gateway 800 can include microphone 810, a speaker 815, and one or more radios (not pictured) that can communicate with external devices using Bluetooth, Wi-Fi, or ethernet, for example. Smart speaker 805 can be docked with gateway 800 so that the devices can communicate directly with each other and share a power source (e.g., to power or charge smart speaker 805). Gateway 800 can communicate with a spa control system over Bluetooth to bridge commands received by gateway 800 from other devices over Wi-Fi or ethernet, for example. Voice commands received by smart speaker 805 can be transmitted to the topside control panel paired with dock 800.

According to some embodiments, gateway 800 and smart speaker 805 are compatible with Amazon Alexa voice commands. In this case, an application executed by gateway 800 is linked to a web-based service provider, and an Amazon Echo Skill configured for voice control is used to link commands between the web-based service provider and Amazon Alexa services. In one example, a user can say the voice command "Alexa, how is my Spa doing?" The associated command routed out through gateway 800 to the web-based service provider and then to Amazon Echo Service and back via the same path requiring only a single radio. When docked, smart speaker 805 can be playing the same audio program as at the spa control system paired via the web-based service provider ("concert mode").

According to other embodiments, gateway 800 does not include a microphone or speakers and is paired with an Amazon Echo smart speaker or similar device. Gateway 800 is paired with the topside controller, and an application executed by the gateway is linked to a web-based service provider. An Amazon Alexa Skill is used to link voice commands between the web-based service provider and the Amazon Echo smart speaker. Voice commands are routed out through the Amazon Echo smart speaker to Amazon Web Services (AWS). AWS links the voice commands to the other web-based service provider, which then sends command to gateway 800, requiring the use of two radios to complete the operation.

Exemplary Computer Controlled System

Embodiments of the present invention are drawn to spa control systems including a topside control panel having an integrated wireless transceiver disposed above the water line of the spa (and outside of an equipment compartment) for communicating with remote devices wirelessly to control various spa-related functions. The following discussion describes one such exemplary electronic system or computer system that can be used as a platform for implementing embodiments of the present invention.

Figure 9:
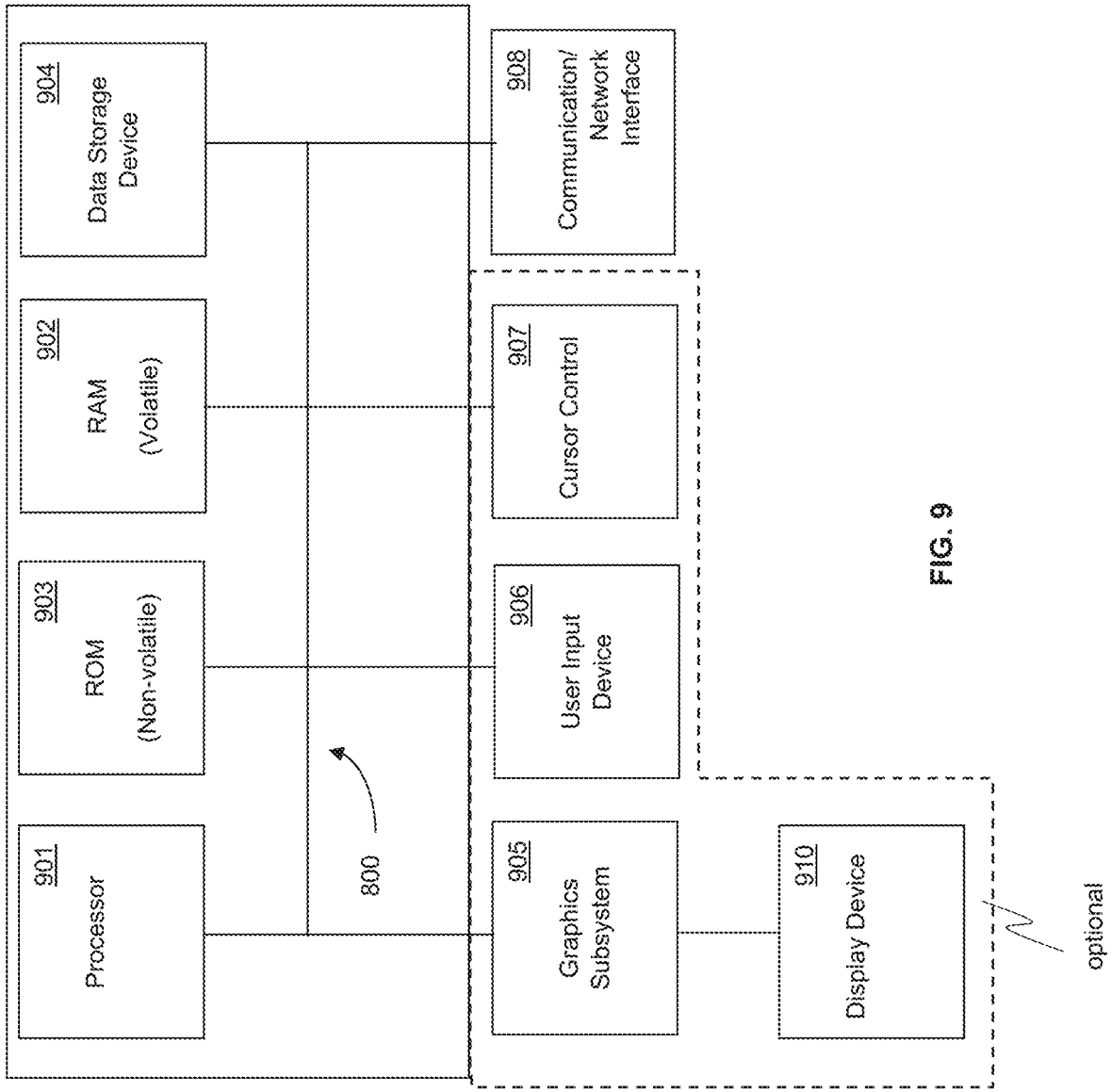
FIG. 9 is a block diagram of an exemplary computer platform upon which embodiments of the present invention may be implemented.

In the example of FIG. 9, the exemplary computer system 912 (e.g., a topside controller or wireless electronic device) includes a central processing unit (CPU) 901 for running software applications and optionally an operating system. Random access memory 902 and read-only memory 903 store applications and data for use by the CPU 901. Data storage device 904 provides non-volatile storage for applications and data and may include fixed disk drives, removable disk drives, flash memory devices, and CD-ROM, DVD-ROM or other optical storage devices. The optional user inputs 906 and 907 comprise devices that communicate inputs from one or more users to the computer system 912 (e.g., mice, joysticks, cameras, touch screens, and/or microphones).

A communication or network interface 908 includes a plurality of transceivers and allows the computer system 912 to communicate with other computer systems, networks, or devices via an electronic communications network, including wired and/or wireless communication and including an Intranet or the Internet (e.g., 902.11 wireless standard). The communication or network interface 908 can operate multiple transceivers simultaneously e.g., an IOT transceiver, a BT/BLE transceiver, a Wi-Fi transceiver, etc.

The optional display device 910 may be any device capable of displaying visual information in response to a signal from the computer system 912 and may include a flat panel touch sensitive display, for example. The components of the computer system 912, including the CPU 901, memory 902/903, data storage 904, user input devices 906, and graphics subsystem 905 may be coupled via one or more data buses 900.

Embodiments of the present invention are thus described. While the present invention has been described in particular embodiments, it should be appreciated that the present invention should not be construed as limited by such embodiments, but rather construed according to the following claims.

What is claimed is:

1. An apparatus comprising:
   a spa controller disposed inside of a spa compartment for operation at a user site and configured to control operation of a plurality of spa components and to generate status data regarding the status of one or more of said spa components;
   a topside control panel disposed outside of the spa compartment and comprising a user interface, wherein the topside control panel is configured to communicate with said spa controller to receive status data from said spa controller, to receive instructions from the user interface, to provide instructions to said spa controller, and to communicate data and commands to said spa controller, wherein the topside control panel comprises a first wireless transceiver for wireless communication with a remote controller device, and wherein the first wireless transceiver is further operable to receive audio data and control data for audio playback and control as a master audio device; and
   a speaker in communication with the first wireless transceiver and configured as a slave audio device operable to be controlled wirelessly by the topside control panel via the first wireless transceiver,
   wherein the topside control panel is operable to process the audio data and to output decoded audio data over a line level connection to an integrated powered amplifier.

2. The apparatus of claim 1, wherein the remote controller device comprises a second wireless transceiver and is operable to receive status data transmitted from said topside control panel over a wireless link between said first and second wireless transceivers.

3. The apparatus of claim 2, wherein the remote controller device is operable to send command data and receive response data from the topside control panel.

4. The apparatus of claim 1, further comprising a network gateway interface operable to communicate with an Internet access point.

5. The apparatus of claim 4, wherein the network gateway interface is configured to route command and response data between the topside control panel and a web-based service provider.

6. The apparatus of claim 1, further comprising the integrated powered amplifier disposed in the spa compartment and coupled to the speaker and operable to drive the speaker.

7. The apparatus of claim 1, further comprising a communication bus that communicatively couples the spa controller to the topside control panel, wherein the spa controller is operable to provide power to the integrated powered amplifier.

8. The apparatus of claim 7, wherein the communication bus is operable to transmit control data received from a wireless device from the topside control panel to the spa controller, and wherein the communication bus comprises at least one of: a RS-485 communication bus; and an RS-422 communication bus.

9. A spa system comprising:
   a basin for holding water;
   spa equipment disposed in an equipment housing and comprising pumps and jets; and
   a topside mounted control panel disposed on a top portion of said basin outside of the spa compartment and operable for controlling said spa equipment and receiving instructions from a graphical user interface (GUI), said topside mounted control panel comprising: a processor; memory; the GUI; and an integrated wireless transceiver operable to wirelessly communicate with a remote controller device for remote control of said spa equipment, wherein the spa equipment further comprises a plurality of speakers configured as slave audio devices, and wherein said integrated wireless transceiver is configured as a master audio device operable to receive audio data for playback using said plurality of speakers, and wherein the topside mounted control panel is operable to process the audio data and to output decoded audio data over a line level connection to an integrated powered amplifier.

10. A spa system as described in claim 9, wherein said integrated wireless transceiver is coupled to communicate with said processor and wherein further, said integrated wireless transceiver is operable to wirelessly receive remote commands and supply said remote commands to said processor for control of said spa equipment.

11. The spa system of claim 9, wherein the spa equipment further comprises RGB lighting sources, and wherein said integrated wireless transceiver is operable to receive lighting control information for adjusting light output of the RGB lighting sources.

12. The spa system of claim 9, wherein the spa equipment further comprises a heat pump, and wherein said integrated wireless transceiver is operable to receive heat pump control information for operating the heat pump.

13. The spa system of claim 9, wherein the spa equipment further comprises a chlorine supply, and wherein said integrated wireless transceiver is operable to receive chlorine supply information for operating the chlorine supply.

14. A spa system as described in claim 9, wherein said integrated wireless transceiver communicates using Bluetooth wireless.

15. A spa system as described in claim 9, wherein said integrated wireless transceiver communicates using BLE wireless.

16. A spa system as described in claim 9, wherein said integrated wireless transceiver communicates using WIFI wireless communication.

17. A spa system as described in claim 9, wherein said integrated wireless transceiver is operable to wirelessly provide spa status information to said remote controller device for display thereof.

18. A spa system as described in claim 9, wherein said integrated wireless transceiver is operable to receive software updates via said remote controller device for updating at least one of: said spa equipment; and said spa topside mounted control panel.

19. A spa system comprising:
a basin for holding water;
spa equipment disposed in an equipment housing and comprising a heater and a pump;
a topside mounted control panel disposed outside of the equipment housing on a top portion of said basin and operable for controlling said spa equipment and receiving instructions via a graphical user interface (GUI), said topside mounted control panel comprising: a processor; memory; the GUI; and an integrated wireless transceiver operable for wirelessly communicating with a web-based service provider, wherein the integrated wireless transceiver is further operable to receive audio data and control data for audio playback and control as a master audio device; and
a speaker in wireless communication with the integrated wireless transceiver and configured as a slave audio device operable to be controlled wirelessly by the topside control panel for playback of audio accessed from the web-based service provider,
wherein the topside mounted control panel is operable to process the audio data and to output decoded audio data over a line level connection to an integrated powered amplifier.

20. The spa system of claim 19, further comprising a network gateway interface that bridges communication between the integrated wireless transceiver and the web-based service provider, wherein the network gateway comprises a dock for receiving a smart speaker, and wherein the smart speaker is configured to:
receive a voice command; and
transmit the voice command to the web-based service provider.

21. The spa system of claim 20, wherein said web-based service provider is configured to:
receive operation data from the integrated wireless transceiver;
analyze said operation data; and
provide spa equipment configuration data to the topside mounted control panel based on analyzed operation data.

* * * * *